(12) United States Patent
Bärnthaler et al.

(10) Patent No.: US 8,043,032 B2
(45) Date of Patent: Oct. 25, 2011

(54) INTERCHANGEABLE TOOL PART FOR A REAMER

(75) Inventors: Walter Bärnthaler, St. Marein (AT); Armin Schelemmer, Oberaich (AT); Klaus Ruetz-Udier, Graz (AT)

(73) Assignee: Mapel Fabrik fur Prazisionswerkzeuge Dr. Kress KG, Aalen (DE)

( * ) Notice: Subject to any disclaimer, the term of this patent is extended or adjusted under 35 U.S.C. 154(b) by 539 days.

(21) Appl. No.: 11/922,523

(22) PCT Filed: Jun. 16, 2006

(86) PCT No.: PCT/AT2006/000246
§ 371 (c)(1),
(2), (4) Date: Nov. 6, 2008

(87) PCT Pub. No.: WO2006/135946
PCT Pub. Date: Dec. 28, 2006

(65) Prior Publication Data
US 2009/0080985 A1    Mar. 26, 2009

(30) Foreign Application Priority Data
Jun. 24, 2005 (AT) .................. A1069/2005

(51) Int. Cl.
*B23P 15/28* (2006.01)
(52) U.S. Cl. ......... 407/100; 407/113; 407/115; 407/116
(58) Field of Classification Search .......... 407/100, 407/223, 116, 114, 115, 113; 408/223
See application file for complete search history.

(56) References Cited

U.S. PATENT DOCUMENTS

| | | | | |
|---|---|---|---|---|
| 2,677,170 A | * | 5/1954 | Kuns et al. ............ | 407/116 |
| 4,086,016 A | * | 4/1978 | Goeke ................ | 407/114 |
| 4,360,297 A | * | 11/1982 | Weber ............... | 407/113 |

(Continued)

FOREIGN PATENT DOCUMENTS

EP    0 631 834 A    1/1995

(Continued)

OTHER PUBLICATIONS

English language translation of the International Preliminary Report on Patentability, IB, Geneva, issued Jan. 16, 2008.

*Primary Examiner* — Boyer D Ashley
*Assistant Examiner* — Omar Flores Sanchez
(74) *Attorney, Agent, or Firm* — Harness, Dickey & Pierce, P.L.C.

(57) ABSTRACT

An interchangeable tool part for a reamer includes a hard metal cutting plate. The cutting surface of the cutting plate is arranged at a distance of at least 0.02 mm from the cutting edge on one side in the region of the cut part and at least partially has a peak-to-valley height which increases by at least 0.01 mm in order to assure the production of cut fragments in the main cutting area and to prevent a build up of cuts in the region of auxiliary cutting section and/or to simplify the removal of cuts. Also high targets can be reached by virtue of the fact that the cutting plates define at least one cutting cavity in the cutting surface thereof at a distance of at least 0.02 mm from the main cutting edge on the end side in the region of the entry angle.

10 Claims, 1 Drawing Sheet

U.S. PATENT DOCUMENTS

| | | | | |
|---|---|---|---|---|
| 4,414,870 A | * | 11/1983 | Peterson et al. | 82/158 |
| 4,834,592 A | * | 5/1989 | Niebauer et al. | 407/114 |
| 5,044,839 A | * | 9/1991 | Takahashi | 407/114 |
| 5,474,406 A | | 12/1995 | Kress et al. | |
| 5,494,383 A | * | 2/1996 | Kress et al. | 408/231 |
| 5,549,424 A | * | 8/1996 | Bernadic et al. | 407/100 |
| 5,577,867 A | * | 11/1996 | Paya | 407/114 |
| 5,660,507 A | * | 8/1997 | Paya | 407/114 |
| 5,704,737 A | * | 1/1998 | Alford | 407/114 |
| 5,722,803 A | | 3/1998 | Battaglia et al. | |
| 5,839,858 A | * | 11/1998 | Paya et al. | 407/115 |
| 6,000,885 A | * | 12/1999 | Erickson | 407/113 |
| 6,161,990 A | | 12/2000 | Oles et al. | |
| 6,739,808 B1 | * | 5/2004 | Ghosh | 407/114 |
| 6,843,620 B2 | * | 1/2005 | Inayama | 407/114 |
| 7,665,933 B2 | * | 2/2010 | Nagaya et al. | 407/116 |
| 7,753,627 B2 | * | 7/2010 | Randecker et al. | 408/199 |
| 2002/0012574 A1 | | 1/2002 | Kress et al. | |
| 2004/0265075 A1 | | 12/2004 | Kolker | |

FOREIGN PATENT DOCUMENTS

EP      1 160 042 A      12/2001

* cited by examiner

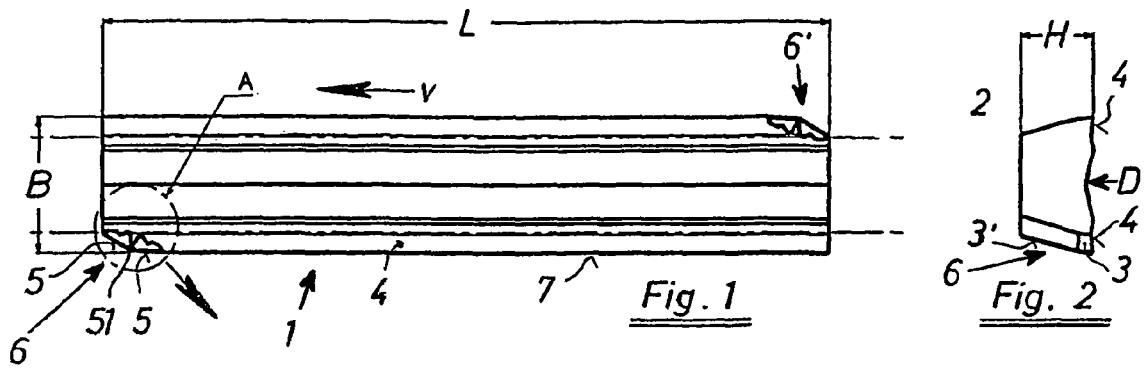
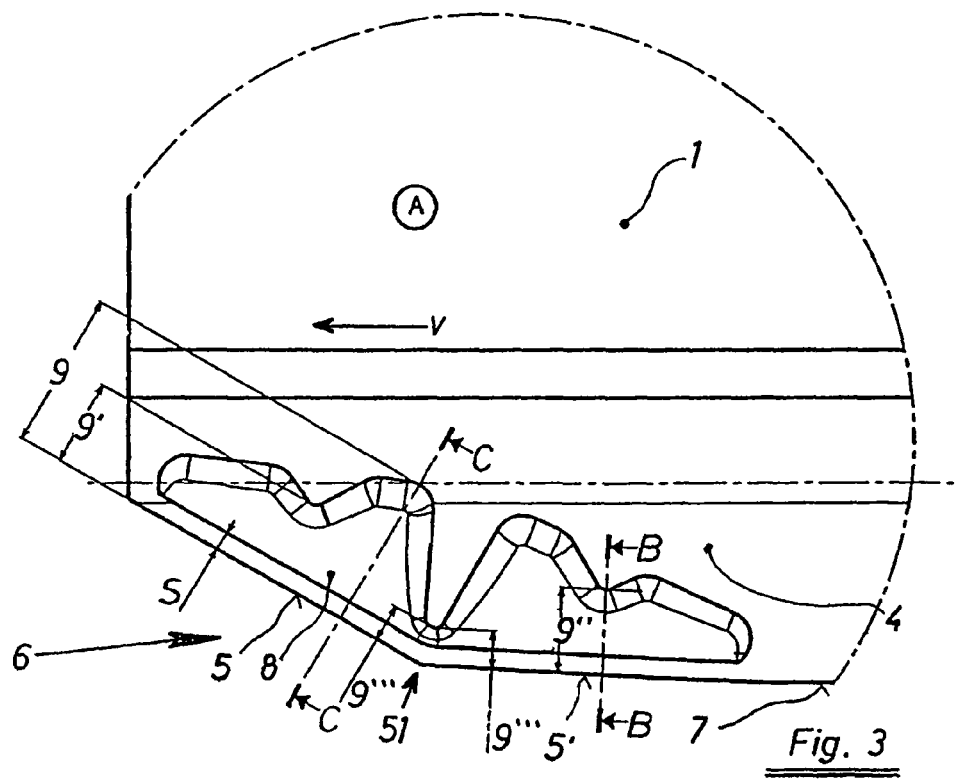
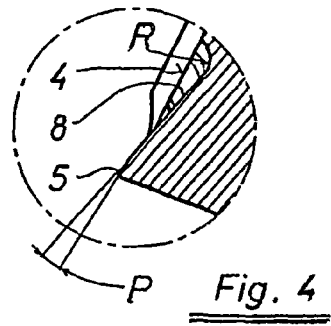

INTERCHANGEABLE TOOL PART FOR A REAMER

CROSS-REFERENCE TO RELATED APPLICATIONS

This application is a National Stage of International application No. PCT/AT2006/000246, filed Jun. 16, 2006. This application claims the benefit of AT A 1069/2005, filed Jun. 24, 2005. The disclosures of the above applications are incorporated herein by reference.

FIELD

The invention relates to a reamer which comprises a shaft comprising a traction part, and, opposite in the axial direction thereof, a working area that is provided with at least one interchangeable tool part and at least one pressure body, whereby the tool part is embodied as a hard metal cutting plate with a length of up to 26 mm, a width of up to 8 mm and a height or thickness of up to approximately 4 mm, designed in particular as an indexable insert, whose cutting plate has a section with a flat support surface in the longitudinal cross-section, tool flanks, forming at least one main cutting edge and one auxiliary cutting edge, respectively, a chip-bearing surface and an essentially concave contact surface for a clamping shoe, and, in the top view, an insertable adjustable auxiliary cutting edge for the cutting process which is essentially parallel to the shaft axis at its ends, that has a starting cut that is angled toward the shaft axis in the feed direction of the reamer with at least one main cutting edge.

BACKGROUND

A plurality of indexable inserts for turning, reaming, planing, milling, boring and the like are known in machining technology that are designed in a work tool to effect a highest possible cutting capacity with an advantageous formation of the chips and whose distance from the cutting area is the same. The target value of these indexable inserts, as mentioned above, is definitely the cutting capacity, whereby the accumulating, essentially coarse chips are broken and/or prepared, where applicable, by means of deformation by chip-breaking tools of the cutting plates for quick, targeted discard.

In reaming, undersized pre-drilled holes are slightly expanded to a high-precision dimension, in order to achieve and ensure a dimensionally accurate transition of components.

Reamers are tools for fine finishing borehole surfaces, whereby the drilled surfaces may be designed as blank holes or as throughholes, and they are mostly formed by a traction part and a tool part with at least one cutting tip. The cutting tips have at least one main cutting edge, which may be formed from several components, and at least one auxiliary cutting edge.

Naturally, with the fine finishing of surfaces, in particular with the reaming of boreholes, substantially different conditions concerning an insertable cutting plate shape as well as chip formation advantageously prevail in comparison with a performance-oriented chip removal from work pieces, but the type as well as the shape and flow of the fine chips removed also greatly influence the quality of borehole surfaces attainable and the service life of the tool in reaming.

According to the state of the art, reamers are provided with differently oriented main and auxiliary cutting edges.

For example, from patent EP 1 160 042, a chip breaker is known that constantly limits the chip-bearing surface facing the cutting edges in the area of the main cutting edge and the auxiliary cutting edge, whereby the chip breaker rises in the area of the main cutting edge and has a decreasing distance to the main cutting edge. Normally, the main cutting edge is used for the roughing operation and the auxiliary cutting edge is used for fine finishing and the chips removed from the cutting edges hit a preferably straight chip breaker and are broken, receiving as well a velocity impulse in a direction that is determined by the slope of the chip breaker.

EP 0 631 834 B1 disposes a cutting tip for a reamer for the fine finishing of metallic work pieces with a main cutting edge and an auxiliary cutting edge as well as a chip-bearing surface protruding toward these cutting edges and with a chip breaker limiting the latter. In order to achieve short chips in fine finishing, the chip breaker is provided with a high point at the vertex of the cutting edges, from which the chip breaker slopes in the area of the main cutting edge and, in the area of the auxiliary cutting edge, it is designed parallel to the latter, or it may likewise be sloping.

However, all cutting plates for reamers according to the state of the art have the same disadvantage in that the flat chip bearing surfaces of the main cutting edge and the auxiliary cutting edge are facing the cutting edges, which collect the chips in particular in the area of the auxiliary cutting edge, whereby, due to the clogging of chips, increased chip removal may result in higher friction coefficient factors and in the generation of heat as well as a reduced surface quality during the fine finishing of the work piece.

SUMMARY

The invention herein is intended to overcome the disadvantages and the objective is to create a reamer of the type mentioned in the introduction, where the hard metal cutting plate ensures little chip accumulation in the main cutting edge, and to prevent a clogging of chips in the area of the auxiliary cutting edge, in which mainly burnishing of the borehole surface takes place with extremely low fine chip removal. This objective can be reached if the chip-bearing surface of the cutting plate arranged at a distance of at least 0.02 mm from the cutting edge at its ends in the area of the starting cut has, at least partially, a roughness depth increased by at least 0.01 mm.

The targeted advantages according to the invention are essentially that the chip-bearing surface has an increased roughness depth exclusively in the indexable insert arranged at a distance from the cutting edge, whereby the chips being removed are clogged due to increased friction and thus a chip breakage is initiated. The broken chips can easily leave the borehole since the roughness of the chip-bearing surface is not increased in the area of the auxiliary cutting edge.

The previously mentioned objective is also achieved according to the invention, in that the cutting plate has at least one chip cavity in its chip-bearing surface arranged at a distance of at least 0.02 mm from the main cutting edge at its ends in the area of the starting cut.

Surprisingly, during fine finishing with a cutting plate, broken short chips can be achieved that can be freely removed if, according to the invention, a chip cavity, arranged at a distance from the cutting edge, is introduced in the chip-bearing surface only in the starting cut, thus in the area of the main cutting edge, in which, during reaming or fine finishing of a borehole, the predominant part of the chips are formed. On the one hand, the chip-bearing surface area in front of the chip cavity operates by means of an increased cutting angle, increasing tool life for the cutting edge; on the other hand, the accumulated chips are obviously compressed by removal from the work piece, and they are immediately stretched thereafter by the entry into the chip cavity on the surface lying at a distance from the work tool and are thus broken into sections. In the area of the unstructured chip-bearing surface on the auxiliary cutting edge, the superfine chips removed from the work piece can be freely discarded with the coarser broken chips accumulated on the main cutting edge. In such a manner, an accumulation of chips in the area of the auxiliary cutting edge can also be counteracted with a reamer according to the invention during increased chip accumulation, which leads to an improvement of the surface of a borehole and to the increase of the tool life.

According to a preferred embodiment of the invention, in which a particularly distinctive and smooth surface quality of the reamed borehole can be achieved by means of fine finishing, the cutting plate has a starting cut with at least one cutting edge at an angle of 10° to 80° to the shaft's longitudinal axis and a maximum length of 4 mm, whereby the transition of the main cutting edge into the axially parallel auxiliary cutting edge area takes place progressively, polygonally, or rounded, as the case may be.

In a further development of the invention, it can be particularly advantageous for long-chipping materials, if the starting cut of the cutting plate has at least two main cutting edges at different angles to the shaft axis and that the chip cavity in the chip-bearing surface of the cutting plate perpendicular to the main cutting edges has a different width, whereby the chip cavity width is preferably reduced in places in the area of the transition of the cutting edges in the starting cut, in particular to a value of less than 0.15 mm.

An embodiment of the cutting plate with a main cutting edge in two parts at different angles to the shaft axis induces a superposed stress in the chips being removed in the axial direction and facilitates an accumulation of small chips. The advantageous chip breakage effect with a different width of the chip cavity has not yet been completely explained scientifically, but it may be the result of the induction of another stress in the chips removed from a main cutting edge.

If, on the one hand, as it can be envisaged according to the invention, the cutting plate has a chip cavity that is located at a distance of at least 0.02 mm from the main cutting edge that is perpendicular to this wedge shape that is recessed in the chip-bearing surface and, on the other hand, that the surface of the cavity, which has an increased roughness depth, where necessary, is otherwise rounded, preferably rounded with a radius of approximately 0.05 mm, returned into the chip-bearing surface, then particularly short chip lengths can definitely be achieved in the area of the starting cut. The chips are thus removed from the work piece to the chip-bearing surface of the cutting plate and are compressed externally.

With the transition of the chips to the chip cavity, they are bent in particular by the wedge shape of the same in the opposite direction to the cavity, whereby emerging tensile strengths may already lead to the chip breakage. Finally, an increased roughness depth of the chip cavity surface or a rounded return of the same into the chip-bearing surface definitely causes a chip breakage into small parts.

With respect to the chip-breaking function and to an avoidance of the breakage of the cutting plate as well as to an increased usability of the reamer, it has been shown to be advantageous if the chip cavity (ies) has (have) a maximum depth greater than 0.03 mm but less than 0.16 mm, if the cavity surface(s) is (are) structured, where applicable.

DRAWINGS

Below, the invention is more closely explained by means of representative drawings of a single embodiment:

Shown are:
FIG. 1 A top view of an indexable insert
FIG. 2 is a sectional view of the indexable insert according to FIG. 1;
FIG. 3 is an enlarged view of the indexable insert in FIG. 1;
FIG. 4 is a section in the starting cut in the CC area of FIG. 3 of the indexable insert according to FIG. 3; and
FIG. 5 is a cut at the in the BB area of the indexable insert according to FIG. 3.

DETAILED DESCRIPTION

FIG. 1 and FIG. 2 illustrate an indexable insert for insertion in a reamer in the plan view and in the sectional view. The indexable insert 1 has, for example, a length L of 16.5 mm, a width B of 3.6 mm, and a thickness H of 2 mm and a starting cut 6, 6' on the opposite corner. In a starting cut 6, a main cutting edge comprising two cutting edge sections 5,5' can be formed that has a transition 51. In the opposite direction to an illustrated feeding direction V of a reamer and in the continuation of the main cutting edge(s) 5, 5', an auxiliary cutting edge 7 is formed.

FIG. 2 shows a sectional view of indexable insert 1 with a contact surface 2 for the insertion of a reamer in the working area. Tool flanks 3,3' and the chip-bearing surface 4 form the main cutting edge (s) 5,5' and an auxiliary cutting edge 7, respectively.

A starting cut 6 of a cutting plate 1 is illustrated in FIG. 3. This starting cut 6 has a main cutting edge 5 at a larger angle and a main cutting edge 5' at an acute angle to the shaft's longitudinal axis, whereby an auxiliary cutting edge 7 connected thereto essentially runs axially parallel. According to the invention, on or in the chip-bearing surface 4 formed by the cutting edges 5, 5', 7, a surface with increased roughness depth (not shown) or a chip cavity 8 is envisaged only in the area of a starting cut 6, thus only in the area of one or more main cutting edge(s) 5, 5'. An increased surface roughness or a chip cavity 8 or in the chip-bearing surface 4 begins only at a distance S from the main cutting edges 5.5', which promotes an improved service life of the same and little chip accumulation. A transition 51 of a front main cutting edge 5 into a subsequent main cutting edge 5' as well as into a connecting auxiliary cutting edge 7 may be carried out angularly, polygonally or rounded.

In a preferred embodiment, a chip cavity 8 arranged at a distance from one of the cutting edges 5, 5' is recessed in a wedge shape at an angle P countersunk in the chip-bearing surface 4 and has different widths 9, 9', 9", 9''', respectively. As also illustrated in FIG. 4 for a Section CC of an area and in FIG. 5 for a Section BB of another area of the starting cut 6, the surface of the chip cavity 8 with different standard distances 9, 9', 9", respectively, from one of the main cutting edges 5, 5' is returned into the chip-bearing surface 4.

In the transition area 51 of the main cutting edges 5,5', a smaller width 9''' is designed in a smaller embodiment of the chip cavity 8, and as a result, as illustrated previously, a breakage of the chips removed in the starting cut area 6 is essentially facilitated.

The invention claimed is:
1. An interchangeable tool part for a reamer, the interchangeable tool part comprising:
a hard metal cutting plate having a longitudinal cross-section and a flat support surface;
tool flanks forming, respectively, at least one main cutting edge and one auxiliary cutting edge; and
a chip-bearing surface;

wherein the chip-bearing surface of the cutting plate has at least a portion with an increased roughness depth of at least 0.01 mm arranged at a distance of at least 0.02 mm from the at least one main cutting edge at its ends in an area of a starting cut;

wherein the hard metal cutting plate has a maximum length of approximately 25 mm, a maximum width of approximately 8 mm and a maximum height or thickness of 4 mm.

2. The interchangeable tool part of claim 1, wherein the interchangeable tool part is an indexable insert of the reamer.

3. The interchangeable tool part of claim 1, wherein the cutting plate defines a generally concave contact surface for a clamping shoe.

4. An interchangeable tool part for a reamer, the interchangeable tool part comprising:

a hard metal cutting plate with a maximum length of approximately 25 mm, a maximum width of approximately 8 mm and a maximum height or thickness of approximately 4 mm, the cutting plate in the longitudinal cross-section having a flat support surface, tool flanks, forming, respectively, at least one main cutting edge and one auxiliary cutting edge, and a chip-bearing surface;

wherein the cutting plate has at least one chip cavity in the chip-bearing surface arranged at a distance of at least 0.02 mm from the main cutting edge at its ends in the area of a starting cut.

5. The interchangeable tool part of claim 4, wherein a transition of the main cutting edge into the auxiliary cutting edge is progressive, polygonal or rounded.

6. The interchangeable tool part of claim 4, wherein the starting cut of the cutting plate has at least two main cutting edges and the chip cavity in the chip-bearing surface of the cutting plate perpendicular to the at least two main cutting edges has different widths respectively, whereby in the area of a transition of the at least two cutting edges in the starting cut, the chip cavity width is reduced in places, to a value of less than approximately 0.15 mm.

7. The interchangeable tool part of claim 4, wherein the chip cavity is arranged at a distance of at least approximately 0.04 mm from the at least one main cutting edge that is recessed in the chip-bearing surface, the chip-bearing surface having an increased roughness depth.

8. The interchangeable tool part of claim 7, wherein the increased roughness depth is rounded with a radius of approximately 0.05 mm.

9. The interchangeable tool part of claim 4, wherein the at least one chip cavity has a maximum depth of at least approximately 0.03 mm and less than approximately 0.16 mm, whereby the cavity surface is structured.

10. The interchangeable tool part of claim 4, wherein the cutting plate is an indexable insert.

* * * * *

UNITED STATES PATENT AND TRADEMARK OFFICE
CERTIFICATE OF CORRECTION

| | |
|---|---|
| PATENT NO. | : 8,043,032 B2 |
| APPLICATION NO. | : 11/922523 |
| DATED | : October 25, 2011 |
| INVENTOR(S) | : Walter Bärnthaler et al. |

It is certified that error appears in the above-identified patent and that said Letters Patent is hereby corrected as shown below:

On the title page item (75), the second inventor "Schelemmer" should be --Schlemmer--

On the title page item (73), the Assignee, "Mapel" should be --MAPAL--.

Signed and Sealed this
Thirteenth Day of March, 2012

David J. Kappos
*Director of the United States Patent and Trademark Office*